UNITED STATES PATENT OFFICE.

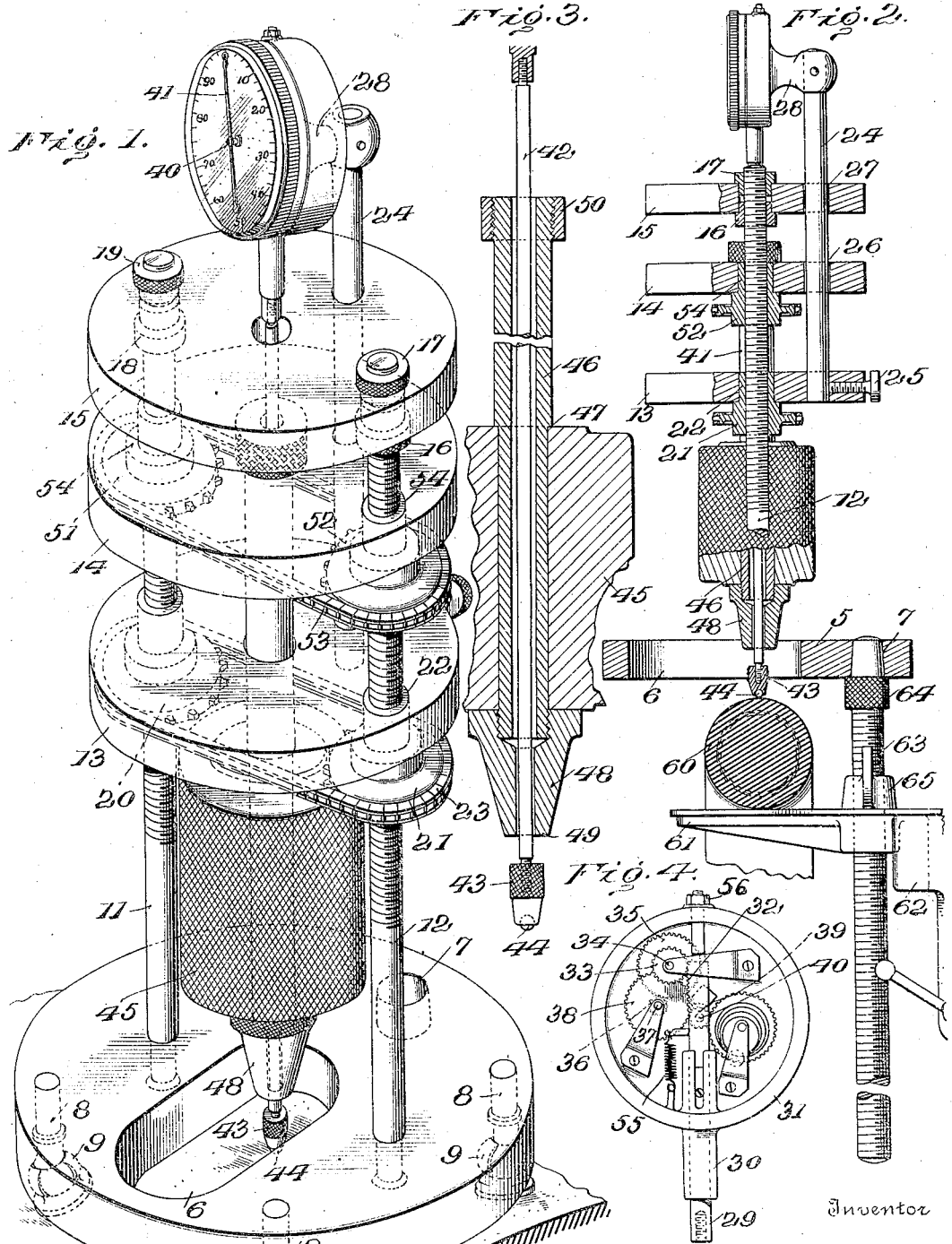

BENJAMIN DENVER COPPAGE, OF WILMINGTON, DELAWARE.

TESTING INSTRUMENT.

1,037,596.

Specification of Letters Patent.

Patented Sept. 3, 1912.

Application filed August 4, 1911. Serial No. 642,356.

*To all whom it may concern:*

Be it known that I, BENJAMIN DENVER COPPAGE, of Wilmington, Delaware, have invented a new and useful Improvement in Testing Instruments, which invention is fully set forth in the following specification.

This invention relates to an instrument or apparatus—which I have designated a "plastometer"—especially designed for testing, that is for measuring and indicating, the relative hardness or softness of the rubber surface of rubber-covered rolls used in machines for manufacturing paper. But the instrument is obviously adapted to the testing of a wide variety of materials and substances. Properties of materials variously known as elasticity, plasticity, viscosity, density, etc., are factors related to the hardness or softness of the materials. Therefore from the indications given by the test for hardness or softness, deductions may be made as to the character and degree of these other properties, or such of them as may be present.

The instrument operates upon the principle of bringing a spherical or semi-spherical part, indentor or contactor, into contact with the surface of the material to be tested, then subjecting the indentor or contactor to the gravitating force of a given weight, and indicating the extent to which the indentor or contactor enters below the normal surface of the material in a given time. As will be evident, the dimensions of the spherical or semi-spherical indentor or contactor may be selected and varied to suit the weight to be applied and the material to be tested; and likewise, that the mass of the weight may be varied with relation to the dimensions of indentor or contactor and the material to be tested. Furthermore, the extent to which the indentor enters the material may be shown by indicating means integrated to various standards or units of distance. For example, most grades of commercial rubber may be tested by a plastometer in which the sphere or indentor is a hardened steel ball one-quarter of an inch in diameter subjected to a weight of one kilogram, the movement of the indentor into the material in a given time, say one minute, being indicated by a micrometer dial gage integrated to 1/100 millimeter. For testing softer materials, a larger ball or less weight, or both, would be necessary or desirable, while for harder materials a smaller ball and greater weight, or both, would be necessary or preferable. Likewise the time during which the weight is applied—the testing period—may advantageously be varied with different materials. But with all such variations in dimensions, weight, etc., the instrument still operates upon the principle of bringing a given weight to bear upon the indentor or contactor without shock, and of measuring and indicating the extent to which said indentor indents or enters below the normal surface of the material in a given time.

The invention may be more fully understood by reference to the accompanying drawing illustrating what I regard at this time to be a preferred embodiment thereof, though as will be apparent the invention is susceptible of a wide variety of embodiments. The particular form of the embodiment may also be adapted to the particular material or shape of material to be tested and other conditions of use.

In said drawings—Figure 1 is a perspective view showing the instrument applied to a convex or cylindrical surface for testing the latter; Fig. 2 is a vertical sectional view, on a smaller scale, with parts broken away and in elevation, illustrating use of the instrument in testing a rubber tire; Fig. 3 is a detail view with parts in elevation and other parts in vertical section; and Fig. 4 is a detail view—looking from the rear of the indicator with the back of its casing removed—showing the interior mechanism of the indicator.

5 is a circular base-plate having therethrough an elongated oval slot 6 and a conical opening 7. As shown in Fig. 1, this plate has four depending legs 8 each having a spherical or ball formation at its lower end loosely engaging the socket of a foot 9, which latter has a flat under-face for contacting the surface 10 of the material to be tested. The surface 10 may, for example, be the cylindrical surface of a rubber-covered roll, such as used in machines for manufacturing paper. By reason of this ball and socket connection between the legs and the feet, the latter may present their flat surfaces to the surface of the roll, thereby affording adequate support for the instrument in a fixed relation to the surface of the material to be tested.

11 and 12 are vertical, approximately parallel rods or standards fixed at their lower ends in the base-plate 5, and screw-threaded throughout the greater portion of their length. These standards pass upward through three circular plates or disks 13, 14, and 15, the upper disk 15 being fixed to the upper end of each rod 11 and 12 by being clamped between milled nuts 16 and 17 screw-threaded on rod 12, and the nuts 18 and 19 screw-threaded on rod 11. The plate 13 rests against and is supported by annular shoulders on the hubs of sprocket-wheels 20, 21, adapted to rotate about standards 11 and 12 respectively, each in screw-threaded engagement with its standard. The hub of each sprocket has a prolongation 22 extending upward through the plate. The sprocket wheels 20 and 21 are connected by a sprocket-chain 23. By manipulating the sprocket-wheels and chain with the fingers, said wheels may be caused to move up or down—according to the direction of rotation—along the screw-threaded standards 11 and 12, thereby raising or lowering the plate 13, which adjustment of the plate serves, as will be seen later, to bring the indentor or contactor into contact with the surface of the material to be tested before the weight is brought into action.

A rod 24 is fixed at its lower end in an opening in plate 13 by means of a set screw 25, passes upward loosely through openings 26 and 27 in the plates and 14 and 15 respectively, and at its upper end is fixed in a socket of rearwardly projecting arm 28 of a dial test gage or indicator to support the same. Any suitable form of indicator or gage may be employed. The indicator illustrated, the interior construction of which is shown in Fig. 4, comprises a vertical rod 29 movable in a sleeve 30 depending from the casing 31, said rod having at its upper end rack teeth 32 meshing with a gear wheel 33 of shaft 34, which shaft also carries a gear wheel 35, meshing with a pinion 36 on a shaft 37 carrying a gear wheel 38, which latter rotates a pinion 39 and its shaft 40, to which shaft is fixed an indicator hand 41 rotatable over a circular dial having 100 integrations, each representing 1/100th of a millimeter. A light spring 55 tends to hold the rod 29 in the position shown in Fig. 4, with the nut 56 on the upper end of said rod in contact with the casing 31. The dial is carried by an annulus or ring rotatable about the casing by gripping its milled peripheral edge, the purpose of such rotation being to bring the zero mark of the dial exactly to the position of the hand when the indentor or contactor is adjusted to the surface to be tested, and before the weight is lowered into action upon the indentor. The rod 29 of the indicator has a screw-threaded socket at its lower end for receiving the screw-threaded upper end of a rod or stem 42, which depends vertically through the center of the plates 15, 14, and 13, and into the slot 6 of the base-plate 5. It will thus be seen that the plate 13 and rod 24 constitute a support for the stem 42, the indicator being interposed and serving to connect said support and stem.

43 is a socket or holder screw-threaded onto the lower end of stem 42, and carrying a steel ball or sphere 44 which constitutes the indentor or contactor for contacting and being forced into the surface of the material to be tested. In testing rubber-covered cylinders for paper machines, for example, I have with success used ball 44 with a diameter of 1/4th of an inch. For harder materials offering greater resistance to indentation, a ball 1/8th of an inch in diameter may be used. Sets of different sized balls with sockets to match may be provided and used according to the character of the material to be tested. The size of the ball, the bulk of the weight, and the period of time during which the weight is applied to the ball, should be so regulated as not to cause the ball to be pressed into the material a distance greater than one-half its diameter, this condition having been found to yield the most reliable and accurate tests.

45 is the weight, preferably of cylindrical form, with its outer surface milled to afford a grip in handling. A tubular stem 46 extends downward through a central opening in the weight, said stem having a shoulder 47 above the weight, and a screw-threaded lower end engaged by a frusto-conical nut 48, the lower flattened end 49 of which is adapted to contact the upper flattened end of the socket 43 in applying the weight to the indentor. The nut 48 and the tubular stem 46 surround the rod 42, and above the weight the stem 46 passes upward loosely through central openings in the plates 13 and 14. A nut 50 screw-threaded onto the upper end of the stem 46 forms a shoulder adapted to bear against the upper surface of the plate 14 around its central opening, and thereby enables said plate, through the hollow stem, to support the weight 45 when the same is not in action. The plate 14 is adapted to rest upon and be supported by annular shoulders on the hubs of two sprocket wheels 51 and 52, which wheels are rotatable in screw-threaded engagement with the standards 11 and 12 respectively. The sprocket-wheels 51 and 52 are connected by a sprocket-chain 53, which causes the wheels to rotate in unison. An upward elongation 54 on each sprocket wheel 51 and 52, extends upward through the plate 14 about its corresponding standard.

In operating the instrument to test, for example, the rubber surface covering on a roll for use in machines for manufacturing paper, the instrument is first placed upon such roll in the position shown in Fig. 1, for example, the plate 14 being raised to remove any pressure of the weight 45 downward upon the stem 42, and hence upon the ball 44. Thereupon, the sprocket wheels 20 and 21 are rotated to lower the plate 13, and with it the rod 24, the indicator and its rod 29, the stem 42 and with it the socket 43 and the ball 44, until the ball rests upon the material to be tested and the indicator mechanism has been lowered with relation to the rod 29 thereof sufficient to cause the hand 41 to make one or more backward revolutions against the tension of the relatively weak spring 55. Sprocket wheels 51 and 52 are then rotated to lower the plate 14, and through it the tubular stem 46 and weight 45 carried thereby, until the lower flattened surface 49 of the nut 48 lightly touches the upper flattened surface of the ball socket or holder 43, which touching will be indicated by a slight tremor of the hand 41. If with the parts as now adjusted, the hand does not stand at zero on the dial, the latter is rotated to move the zero on the dial exactly to the hand. With the parts thus set to begin the test proper, the time is taken, and the sprocket-wheels 51 and 52 are further rotated to lower the weight until it is fully supported upon the ball-holder or socket 43, the downward movement of the plate 14 withdrawing the latter from contact with the under edge of the nut 50 on the tubular stem 46. When the weight 45 has thus been allowed to act by gravity upon the ball 44 for a period of say one minute, the position of the hand 41 is noted, the reading of the dial taken, and the sprocket wheels 51 and 52 manipulated to elevate the plate 14 and lift the weight 45 from the contactor 44. Assuming the hand to have reached the 85 mark on the dial, the reading for the test may be thus expressed:

$$\frac{1K.85}{.250}$$

meaning that in one minute's time the ball indented or entered the material a distance of 85/100 of one millimeter, using a weight of one kilogram and a ball 1/4th of an inch in diameter.

Fig. 2 shows the same instrument, on a smaller scale, as conveniently supported and used in testing a small solid rubber vehicle tire. 60 is the tire resting upon a bracket 61 rigidly held in the jaws of a vise 62. A screw-threaded rod 63 is positioned vertically through a screw-threaded opening in the bracket 61, and at its upper end has a milled enlargement 64 adapted to be gripped in turning the rod, and above the enlargement a frusto-conical end adapted to closely fit in the frusto-conical opening 7 of the base-plate 5, heretofore referred to. For a general adjustment of the position of the instrument with relation to the surface of the tire, the rod 63 may be rotated and moved up and down by gripping the enlargement 64, and then setting the clamp nut 65. After this preliminary adjustment is accomplished, the test is carried out by operating the instrument in the manner previously explained.

What I claim is:—

1. In a testing instrument of the character set forth, the combination of a stem, a contactor carried by the stem, a support for the stem, means for imparting movement to said support and through it to the stem to adjust the position of the contactor with relation to the material to be tested, and a weight the gravitating force of which is adapted to be applied to said contactor to force the same into the material being tested.

2. In a testing instrument of the character set forth, the combination of a stem, a contactor carried by the stem, a support for said stem, means for imparting movement to said support and through it to the stem to adjust the position of the contactor with relation to the material to be tested, a weight the gravitating force of which is adapted to be applied to said contactor and stem to force the contactor into the material being tested and to correspondingly move the stem, and an indicator actuated by said movement of the contactor and stem to indicate the distance of movement of the contactor into the material under test.

3. In a testing instrument of the character set forth, the combination of a stem having a contactor thereon, a support for the stem, an indicator through the intermediary of which the stem is suspended from said support, and a weight the gravitating force of which is adapted to be applied to the stem to force the contactor into the material being tested.

4. In a testing instrument of the character set forth, the combination of a contactor, a weight, and weight supporting means movable from a supporting to a non-supporting position to thereby deliver and apply the gravitating force of the weight to the contactor to force the same into the material being tested.

5. In a testing instrument of the character set forth, the combination of a stem, a contactor carried by the stem, means for imparting movement to the stem to adjust the position of the contactor with relation to the material to be tested, a weight, and weight-supporting means movable from a supporting to a non-supporting position to thereby deliver and apply the gravitating force of the weight to the contactor to force the same into the material being tested.

6. In a testing instrument of the character set forth, the combination of a stem, a contactor carried by the stem, means for imparting movement to the stem to adjust the position of the contactor with relation to the material to be tested, a weight, weight-supporting means movable from a supporting to a non-supporting position to thereby deliver and apply the gravitating force of the weight to the contactor to force the same into the material being tested, and an indicator actuated from said stem to indicate the distance of movement of the contactor into the material under test.

7. In a testing instrument of the character set forth, the combination of a vertical stem, a contactor carried at the lower end thereof, a weight about the stem, and weight-supporting means movable from a supporting to a non-supporting position to thereby deliver and apply the gravitating force of the weight to the contactor to force the same into the material being tested.

8. In a testing instrument of the character set forth, the combination of a vertical stem, a contactor at the lower end of the stem having a semi-spherical contacting surface, a weight, and weight-supporting means movable from a supporting to a non-supporting position to thereby deliver and apply the gravitating force of the weight to the contactor to force the same into the material being tested.

9. In a testing instrument of the character set forth, the combination of a stem, a contactor in the form of a ball carried by the stem at its lower end, a weight, and weight-supporting means movable from a supporting to a non-supporting position to thereby deliver and apply the gravitating force of the weight to the contactor to force the same into the material being tested.

10. In a testing instrument of the character described, a stem, a contactor at the lower end of the stem, an indicator connected to the upper end of the stem, and a weight through which the stem passes the gravitating force of said weight being adapted to be applied to said contactor and stem to force the contactor into the material being tested and through the stem to actuate the indicator to show the distance of movement of the contactor into the material under test.

11. The combination of a stem, a contactor at the lower end of the stem, an indicator connected with the upper end of the stem, means for adjusting the stem to position the contactor to the material being tested, a weight through which the stem passes, and weight-supporting means movable from a supporting to a non-supporting position to thereby apply the gravitating force of the weight to the contactor and stem.

In testimony whereof I have signed this specification in the presence of two subscribing witnesses.

BENJAMIN DENVER COPPAGE.

Witnesses:
 Thos. Butterworth,
 Thomas Leonard.